June 11, 1968    R. E. BRIDEWESER ETAL    3,388,299
RESIDENTIAL UNDERGROUND ELECTRIC DISTRIBUTION ASSEMBLY
Filed Feb. 13, 1967    2 Sheets-Sheet 2

INVENTORS
RALPH E. BRIDEWESER
EDWARD A. NEYDU
BY
Smythe & Moore
ATTORNEYS

3,388,299
RESIDENTIAL UNDERGROUND ELECTRIC DISTRIBUTION ASSEMBLY

Ralph E. Brideweser, Goldsboro, N.C., and Edward A. Neydli, Watertown, Wis., assignors to Sola Basic Industries, Inc., Milwaukee, Wis., a corporation of Wisconsin
Filed Feb. 13, 1967, Ser. No. 615,740
9 Claims. (Cl. 317—120)

ABSTRACT OF THE DISCLOSURE

As assembly suitable for power supply to residences from underground distribution wiring, including an enclosure with a bulkhead and a dry-type transformer on one side of the bulkhead and disconnect means on the other side.

---

This invention relates to electric power distribution assemblies especially suitable for use in conjunction with residential developments with underground wiring systems.

In housing developments, underground distribution systems are coming into wider use for various reasons. In conventional pole type or other presently used systems, the transformer and appurtenant equipment is installed in the development when the houses are being built. If a particular house is not occupied immediately, considerable equipment may be on the site but not used which may represent a considerable economic loss. Another problem is that power requirements for a house may change and it is desirable to be able to change the transformer with ease to that needed, which is not always feasible with present systems which may require major changes. Further, it is desirable to be able to service the equipment with ease.

One of the objects of the invention is to provide a power distribution system which will have low servicing costs and which will make it possible easily to change transformer sizes when needed.

A still further object of the invention is to provide a distribution system wherein equipment does not have to be installed to serve individual houses until it is needed.

In one aspect of the invention, a unitary assembly is provided having an enclosure with a bulkhead therein and a dry-type transformer on one side with a fuse assembly. On the other side of the bulkhead, there is located a removable connecting means between the power source and terminals on the bulkhead. A dummy mounting for the disconnect is located on the bulkhead. A lightning arrester, if desired, also can be located on the side of the bulkhead in which the power leads are located. In another form, a pair of disconnect terminals can be used so that a connection is provided in conjunction with loop feeds to permit one individual unit to be disconnected without affecting the other transformers in the development.

These and other objects, advantages, and features of the invention will become apparent from the following description and drawings which are merely exemplary.

Figure 1:
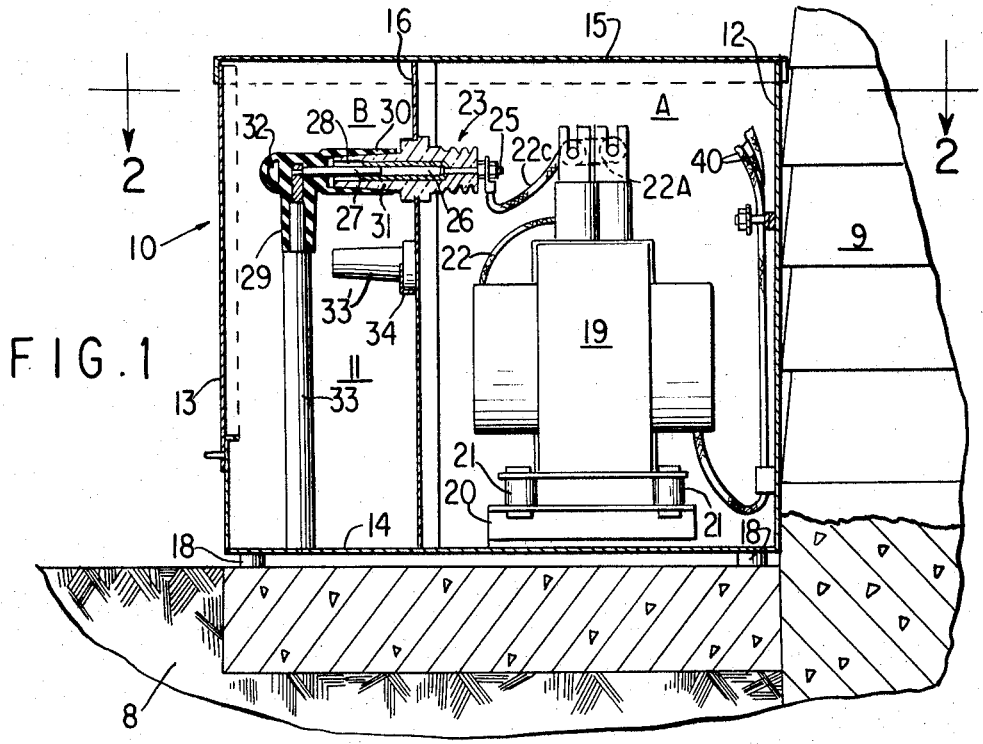
FIG. 1 is a section elevation view of one form of the invention.
Figure 2:
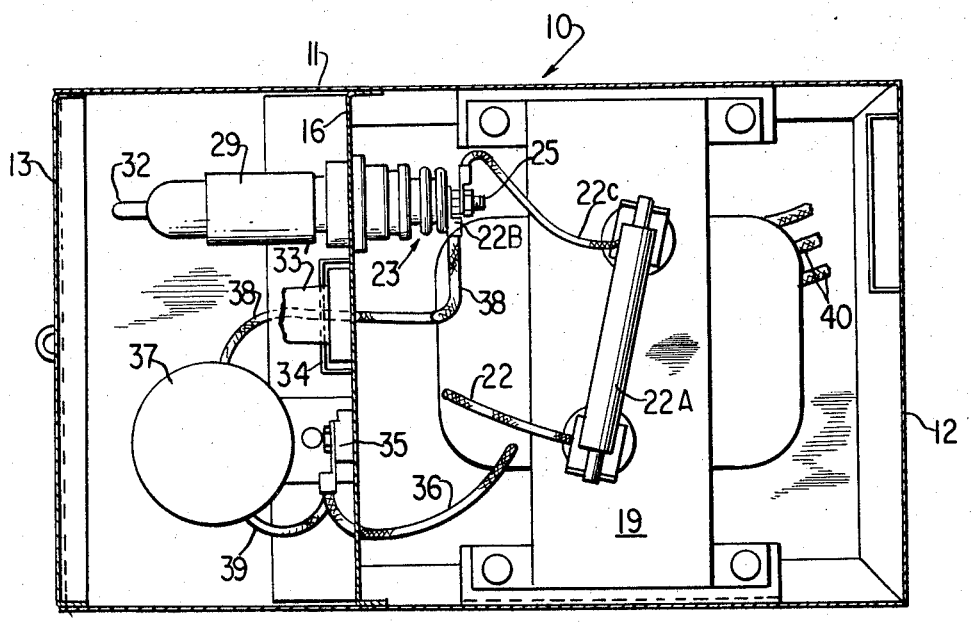
FIG. 2 is a view along the line 2—2.

Referring to FIGS. 1 and 2, enclosure 10 has side walls 11, back wall 12, removable cover 13, bottom wall 14, and top wall 15. Bulkhead or separating plate 16 is mounted between side walls 11 and suitably secured thereto. Bottom wall 14 can be mounted on a concrete or other material pad. Noise insulating pads 18 can be used. The enclosure assembly can be placed on the ground 8 near the walls 9 of the house.

Dry-type transformer 19 of the required size is mounted on plate 20, insulating pads 21 being interposed between the transformer and plate 19.

One side of the high voltage winding of transformer 19 is connected by lead 22 through fuse 22A (FIG. 2) to the stationary part of the disconnect or terminator means 23 through lead 22C.

The terminator may take various forms. In the one shown, bushing 23 mounted on bulkhead 16 has a stationary terminal 25 with an aperture 26 therein to receive the male contactor 27 and an arc snuffing arrangement 28. The male contactor 27 is carried by the removable disconnect body 29 having a tapered opening 30 which is slidable onto the outer tapered portion 31 of bushing 23. Underground high voltage cable 33 is connected to the male contactor 27.

Aperture 32 in body 29 permits a conventional stick having a hook to be used for safely pulling the disconnector body 29 from the terminal.

After removal of the disconnector 29 from live bushing 23, the disconnect body can be pushed onto dead bushing 33' (FIG. 1). Dead bushing 33' may be removably mounted in saddle 34.

Ground pad 35 is connected to the other side of the high voltage winding of the transformer by lead 36 and in turn is fastened to bulkhead 16.

If desired, a lightning arrester 37 (FIG. 2) can be mounted on bulkhead 16 or in the enclosure and connected to stationary terminal 22B by lead 38. The other side of the arrester 37 is connected by wire 39 to ground pad 35.

Low tension or low voltage wires 40 from the transformer secondary can be led into the interior of the house or building in the usual manner.

Thus, a dry-type transformer and fuse is in compartment A and the disconnect and lightning arrester in dead compartment B having access cover 13. Cover 13 can be locked in place.

Figure 3:
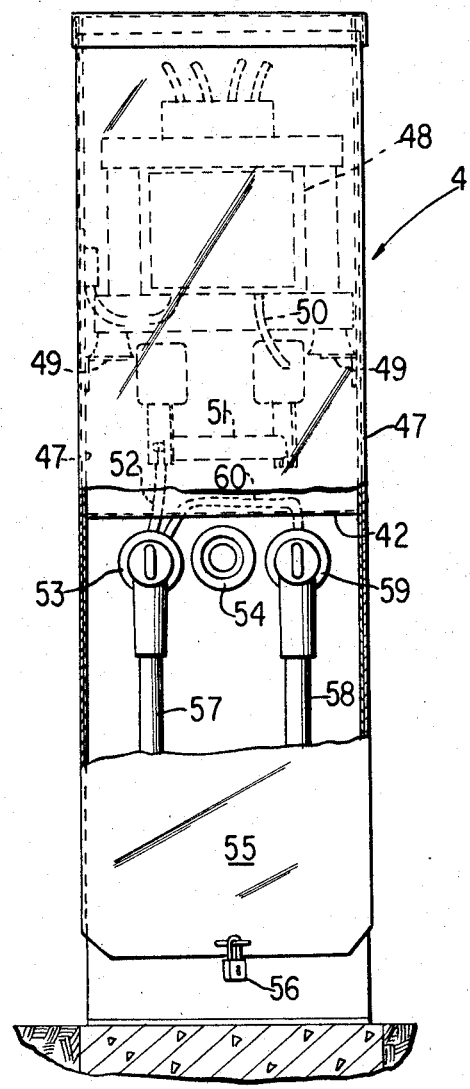
FIG. 3 is a broken elevation view partially in section of another form of the invention.
Figure 4:
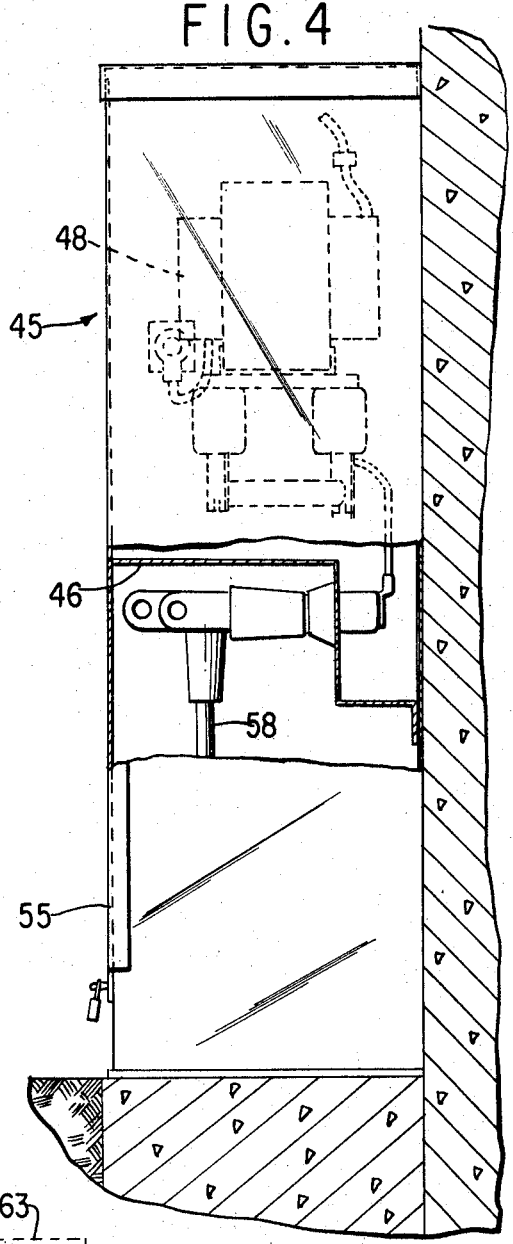
FIG. 4 is a broken side view of FIG. 3.

Another form of the invention is illustrated in FIGS. 3 and 4 wherein the parts are vertically arranged. Enclosure 45 has a bulkhead 46 extending between side walls 47. Dry transformer 48 is mounted on brackets 49 on the sidewalls. One of the high voltage primary leads 50 from transformer 48 is connected through fuse 51 and lead 52 to stationary disconnector 53 in a manner similar to that described for FIGS. 1 and 2.

A ground pad is located in the lower compartment similar to FIGS. 1 and 2 and a dummy or dead bushing 54 is carried on bulkhead 46. Front access cover 55 may be locked in place by lock 56.

In the form shown in FIGS. 3 and 4, a loop feed can be used employing two high voltage feed wires 57 and 58 from the distribution system. A second disconnect or terminator is used. The stationary terminals of disconnects or terminators 53, 59 are connected together by wire 60 in back of bulkhead 46.

Figure 5:
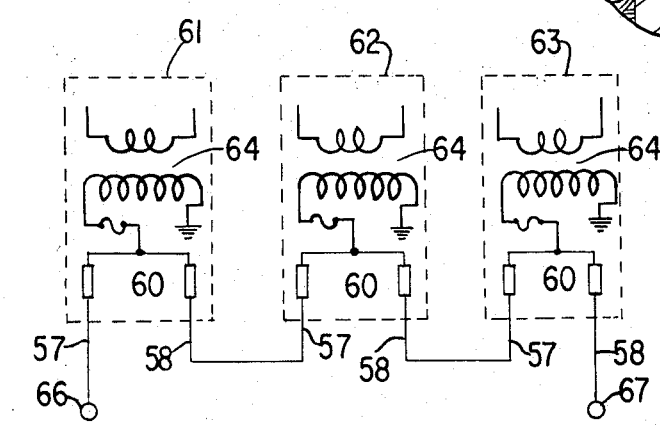
FIG. 5 is a schematic wiring diagram of one manner of using the invention.

FIG. 5 schematically shows a loop feed wherein schematically shown assemblies 61, 62, 63 corresponding to the enclosures previously described have transformers 64 therein with one side of the primaries thereof connected to lead 60 or one of the disconnectors in a suitable manner. If one of the units is out of service, one of its disconnectors can be removed from a live terminal and placed on the dummy terminal. Also, another disconnector in an adjoining unit can be removed so as to isolate the unit taken out of service. Then, as is known in the art, high voltage can be connected to both sides of the loop feed at 66 and 67 so that the other residences are supplied with power.

It also is possible to mount a conventional watt-hour meter on an outside wall of an enclosure or to connect it to the transformer therein. Also, the assembly could be mounted on the wall of the house. The transformer compartment can be sized for the largest transformer needed. Then, even though such is not used at first, a larger one can be placed in the enclosure. Thus, if the load grows, it is merely necessary to replace the smaller transformer or vice versa.

It should be apparent that variations in arrangement and details of construction can be made without departing from the spirit of the invention except as defined in the appended claims.

What is claimed is:

1. In a unitary residential type transformer and power feed assembly, the combination including an enclosure, bulkhead means mounted between two walls of said enclosure, said bulkhead means dividing said enclosure into first and second compartments, a dry-type transformer in the first of said compartments, power supply lead means entering said second compartment from the exterior of said enclosure, power connector means having a bushing and stationary terminal means mounted on said bulkhead means, connecting means from said stationary terminal means to the primary winding of said transformer, removable disconnector means removably mountable on said bushing in said second compartment, means connecting said power supply lead means to said removable disconnector means, and dummy means in said second compartment for holding said removable disconnector means when not connected to said stationary terminal means.

2. An assembly as in claim 1 wherein the dummy means is on said bulkhead.

3. An assembly as in claim 1 wherein there is a ground pad connected to the other side of the primary winding.

4. An assembly as in claim 1 wherein there is a fuse means mounted on said transformer in the connection between said transformer and said terminal means.

5. An assembly as in claim 4 wherein there is a lightning arrester in the second compartment connected between said terminal means and a ground pad.

6. An assembly as in claim 1 wherein there is a second bushing and stationary terminal means on said bulkhead, there is a second power supply means and disconnector means for mounting on said bushing and there is a connection between said terminal means.

7. An assembly as in claim 5 wherein there is a removable front cover to said second compartment and said enclosure has means for mounting on a pad adjacent a building.

8. An assembly as in claim 7 wherein the first and second compartments are in horizontal alignment.

9. An assembly as in claim 7 wherein the first and second compartments are in vertical alignment.

References Cited

UNITED STATES PATENTS

| | | | |
|---|---|---|---|
| 3,014,158 | 12/1961 | Nelson et al. | 174—52 XR |
| 3,025,432 | 3/1962 | Giegerich | 317—99 |
| 3,335,380 | 8/1967 | Gramlich et al. | 174—52 XR |

ROBERT K. SCHAEFER, *Primary Examiner.*

M. GINSBURG, *Assistant Examiner.*